United States Patent
Hessom et al.

(10) Patent No.: US 10,023,256 B2
(45) Date of Patent: Jul. 17, 2018

(54) STREAMLINE STORAGE SYSTEM

(71) Applicants: Nicholas Dale Hessom, Leechburg, PA (US); Stephen Richard Sader, West Leechburg, PA (US); William Kristopher Sullivan, Apollo, PA (US)

(72) Inventors: Nicholas Dale Hessom, Leechburg, PA (US); Stephen Richard Sader, West Leechburg, PA (US); William Kristopher Sullivan, Apollo, PA (US)

( * ) Notice: Subject to any disclaimer, the term of this patent is extended or adjusted under 35 U.S.C. 154(b) by 0 days.

(21) Appl. No.: 15/718,838

(22) Filed: Sep. 28, 2017

(65) Prior Publication Data

US 2018/0105223 A1    Apr. 19, 2018

Related U.S. Application Data

(60) Provisional application No. 62/408,209, filed on Oct. 14, 2016.

(51) Int. Cl.
*B62J 9/00* (2006.01)
*B62K 19/40* (2006.01)

(52) U.S. Cl.
CPC .............. *B62J 9/006* (2013.01); *B62K 19/40* (2013.01)

(58) Field of Classification Search
CPC ......... B62J 1/20; B62J 1/18; B62J 1/22; B62J 1/28; B62J 9/006; B62K 19/40
See application file for complete search history.

(56) References Cited

U.S. PATENT DOCUMENTS

| | | | | |
|---|---|---|---|---|
| 4,733,907 A | * | 3/1988 | Fellenbaum | B62J 1/18 224/427 |
| 5,890,760 A | * | 4/1999 | Kirstein | B62J 1/20 297/195.1 |
| 6,354,476 B1 | * | 3/2002 | Alderman | B62J 7/04 224/413 |
| 8,720,759 B1 | * | 5/2014 | Henderson | B62J 11/02 224/275 |
| 8,936,313 B2 | * | 1/2015 | Skarvan | B62J 1/20 297/219.11 |
| 2013/0207423 A1 | * | 8/2013 | Russell | B62J 1/20 297/188.2 |

* cited by examiner

*Primary Examiner* — Corey Skurdal
(74) *Attorney, Agent, or Firm* — The Lynch Law Group, LLC; Kathleen Roznicki

(57) ABSTRACT

Disclosed is a streamlined storage system for use with a motorcycle or other similar vehicle seat that does not detract from the riding experience, that is easy and convenient for the rider to access while riding, and that does not substantially increase the overall cost of the vehicle.

13 Claims, 6 Drawing Sheets

STREAMLINE STORAGE SYSTEM

PRIORITY CLAIM

This application claims priority to provisional application Ser. No. 62/408,209 filed on Oct. 14, 2016, the disclosure of which is fully incorporated in this current application.

BACKGROUND

Riders of motorcycles or other similar vehicles know how inconvenient it is to carry practically any item while riding unless they choose to ride "Baggers". Riders of motorcycles and other similar vehicles often find they need small "everyday items" such as a pair of sun glasses, a wallet, or even sunscreen, but are hampered from carrying such items while riding if they choose certain styles of motorcycles. Riders do have the option carrying the items in vests or in back packs, but the added extra weight and awkwardness take away from the enjoyment of the riding experience. Bungee cords or luggage racks are other options to secure items such as water bottles on vehicles, but may result in an item scratching or damaging parts of the vehicle.

What is need is a solution to having storage on a motorcycle or other similar vehicle that does not detract from the riding experience, that is easy and convenient for the rider to access while riding, and that does not substantially increase the overall cost of the vehicle.

SUMMARY OF THE INVENTION

Disclosed is a new and improved vehicle seat with a pouch system. Preferably the pouches are big enough for storing miscellaneous everyday items such as ID cards, wallets, sun glasses, sun screen, water bottles, etc., yet small enough to be hidden when not in use. Preferably, the pouch system is connected to the interior of the vehicle seat, more preferably the pouch system is connected to the vehicle seat within an interior pocket of the vehicle seat via a side opening, and most preferably the interior pocket is large enough to completely store the pouch attachment when not in use securing items. The pouch attachment system does not detract from the riding experience, are easy and convenient storage for small "everyday items" that a rider can access while riding, and installation of such a pouch attachment system into a vehicle seat will not substantially increase the overall cost of the vehicle.

SHORT DESCRIPTION OF FIGURES

DETAILED DESCRIPTION

Riders of motorcycles and other similar vehicles have had a long time need for a convenient, on-the-go streamline storage on their vehicles that can be easily accessed when needed, and then folded away when not needed. Convenient on-the-go streamline storage would allow a rider to enjoy riding a fun and sportier bike (rather than, a "Bagger") without themselves or their passenger wearing a back pack for carrying items or trying to somehow secure items directly to the vehicle, where there is a substantial risk of an item flying off during the riding trip. Disclosed is a vehicle seat with a pouch system that can be used with any ATV, motorcycle (including choppers), or marine vehicle. Preferably the pouch system is connected to the interior of the vehicle seat, more preferably the pouch system is connected to the vehicle seat within an interior pocket of the vehicle seat, and most preferably the interior pocket is large enough to completely store the pouch system when not in use as storage. Pouch systems can be constructed of any durable material including but not limited to leather, various forms of nylon (Rip-stop, Packcloth, Cordura®), canvas, or denim. Pouch system material may or may not be treated with a water-proofing chemical or treated to reduce friction for easy insertion or extraction. Pouches may or may not comprise a means to close said pouch such as a zipper, Velcro®, or a drawstring design. Most preferably the pouch systems can be folded or rolled up and then folded into the interior pocket of a vehicle seat via a side opening when not in use. Most preferably while folded inside the pouch systems do not add a bump or in any way alter the seating area of a vehicle seat. Whether being stored in the interior or whether splayed out and carrying items, the pouch system is designed to stand up to the abuse that will typically occur with on and off-road riding. Pouch systems can be used on a variety of vehicle seat design including but not limited to motorcycle seats such day tripper, touring, solo, vintage, and cobra styles and are sized to carry "everyday items" such as a pair of sun glasses, a wallet, or sunscreen.

Figure 1:
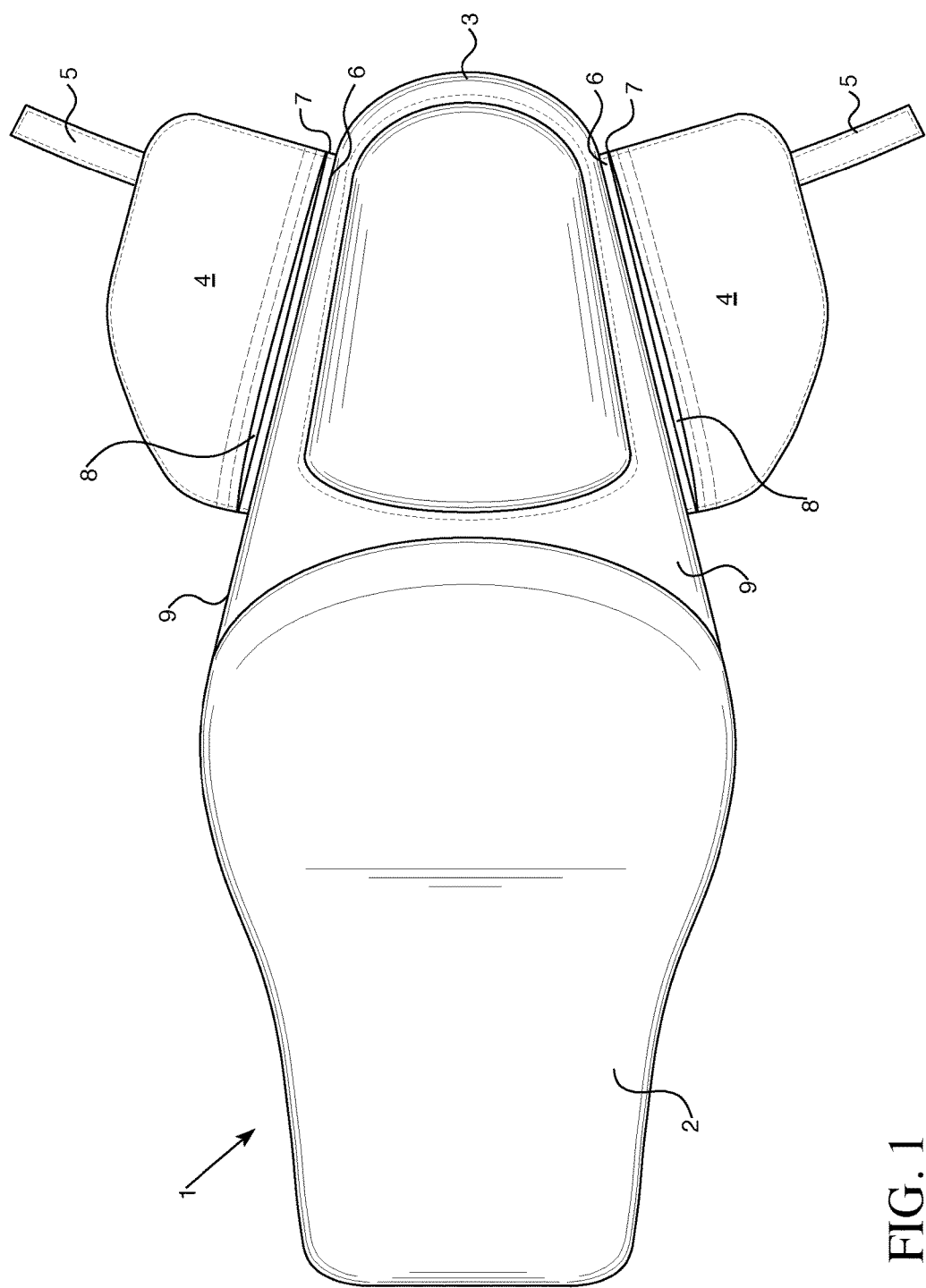
FIG. 1 is a top view of an embodiment of a seat of this disclosure shown with pouches hanging out.
Figure 2:
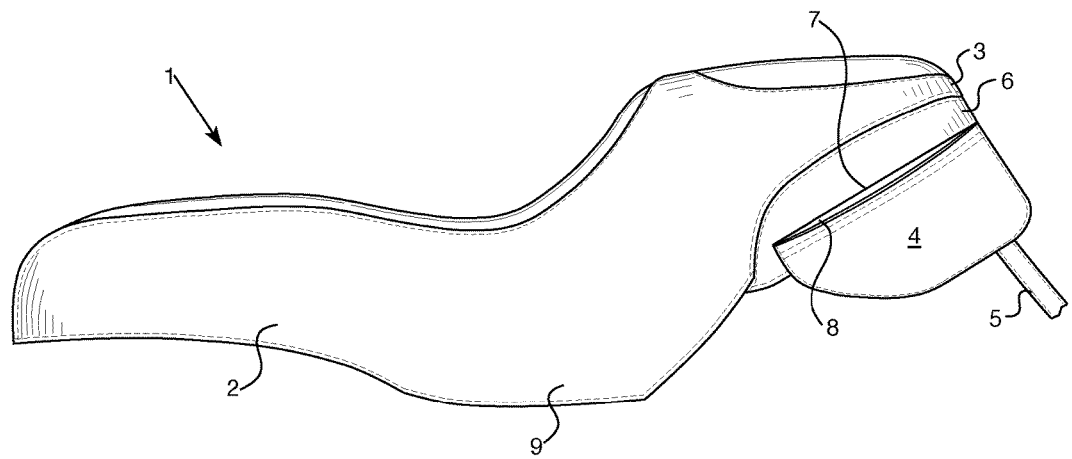
FIG. 2 is a side view of an embodiment of a seat of this disclosure shown with a pouch hanging out.

FIGS. 1 and 2 show a top view and a side view respectively of an embodiment of a seat of this disclosure shown with pouches hanging out. Seat 1 is comprised of an anterior 2 and a posterior 3. Pouches 4 with tabs 5 are hanging out via slit opening formed by outer flaps 6 that are part of seat cover 9. Though the pouches 4 are shows here as a preferred contoured shape, any feasible shape is contemplated by this disclosure, for example, squarish or rounded pouches which might work better-with alternative seat designs. Typical motorcycle seat covers are skin tight and outer flaps 6 provide some give to allow the pouches 4 to more easily be inserted and extracted from an interior storage of seat 1. Having tabs 5 as webbed straps are preferred; however, this disclosure contemplates pouches with no tabs or any functional style of tabs known to those skilled in the art. Tabs 5 can be placed anywhere on pouches 4 and allow the user to easily grasp and pull out the pouches when they stored in the interior of the seat 1. Tabs 5 may also be long enough to attach pouches 4 to vehicle to reduce pouch movement. Pouch opening 8 in pouches 4 can be made more secure by using Velcro, a drawstring, a zipper, or any securing system known to those skilled in the art. The pouch interior can have additional compartments, such as plastic inserts as a non-limiting example, for holding smaller items such as driver's licenses, credit cards, cash bills, etc. Ultimately the size of the pouches used will depend on the actual seat design with which they are being used and practically speaking the pouches need to be sized to be clear of the moving vehicle parts such as belts. Preferably the pouches 4 will be sized to 20 oz. drink bottle and other items that people generally put in their pockets while traveling-keys, wallets, cell phone, etc.

Actual placement of the pouch system in the vehicle seat will depend on the specific seat design desired. It is preferred that the pouch system is placed in the portion of the vehicle seat that does not accommodate the rider. For example, in these Figures is depicted a day tripper seat design wherein the pouch system is installed in the rising rear portion, because it is more convenient, conducive, and less disruptive to rider. But front seat insertion designs that will not interfere with rider are also contemplated by this disclosure. Preferably there are two pouches, one for either side, but only a single pouch on one side or a plurality of pouches on one or both sides is also contemplated.

Figure 3:
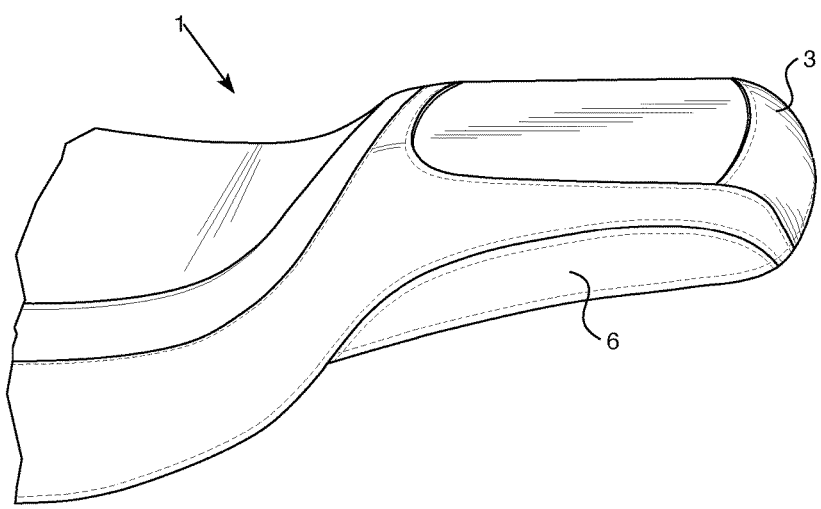
FIG. 3 is a side view of an embodiment of a seat of this disclosure shown when the pouch is stored in the interior.

FIG. 3 shows the same embodiment as FIGS. 1 and 2 wherein the pouches 4 (not seen) are folded in the interior of the seat 1 with outer flaps 6 in a closed positon. Preferably slit openings 7 are secured when outer flaps 6 are in the closed position giving a hidden effect. Slit openings 7 can be secured by zipper, Velcro, snaps, or any other type of securing mechanism known in the art. Preferably the pouches 4 are folded in such a way that the tabs 5 will easily be accessed and used by rider to pull out the pouches 4 when stored inside the seat 1.

Though shown here is a day tripper style, this disclosure contemplates the pouch system to be adaptable to any style of motorcycle seat or other vehicle seats including ATVs and marine vehicles.

Figure 4:
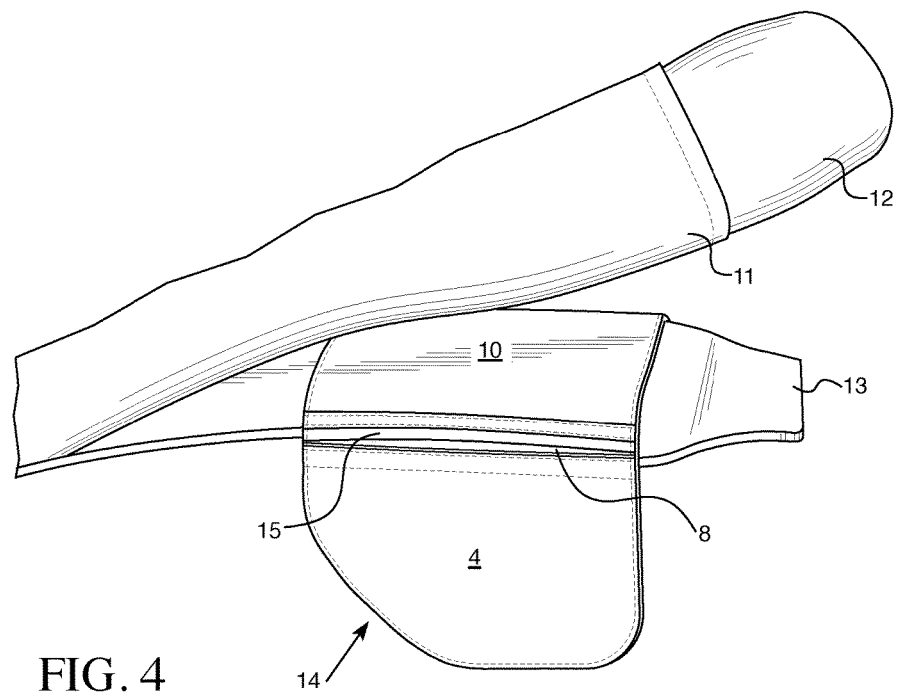
FIG. 4 is an open side view of an .embodiment, of a seat shows with the seat cover removed to reveal the interior.

FIG. 4 is an open side view of the embodiment shown in FIGS. 1-3 with the seat cover 2 removed to reveal the interior. Pouch system 14 is comprised of horizontal attachment 10 which is connected to side flaps 15 which are comprised of pouches 4 with openings 8. Horizontal attachment 10 attaches to seat pan 13 by any means known in the art, though preferably rivets are used as the attachments because they distribute the pressure on the fabric being used so as to not cut up or rip through the material. Sleeve 11 holding foam 12 sits atop of horizontal attachment 10. When pouches 4 are in the storage configuration, they sit in between sleeve 11 and horizontal attachment 10. It is preferred that the foam of the vehicle is surrounded by a sleeve or an equivalent, such that is easier to insert pouches into and extract pouches out of the interior of a vehicle seat. Sleeve 11 creates a barrier from the foam 12 so that pouches 4 do not bind up when being extracted or being pushed back in for storage. Sleeve 11 also protects the foam 12 from being exposed to and harmed by weather, fingernails, rings, etc.

Figure 5:
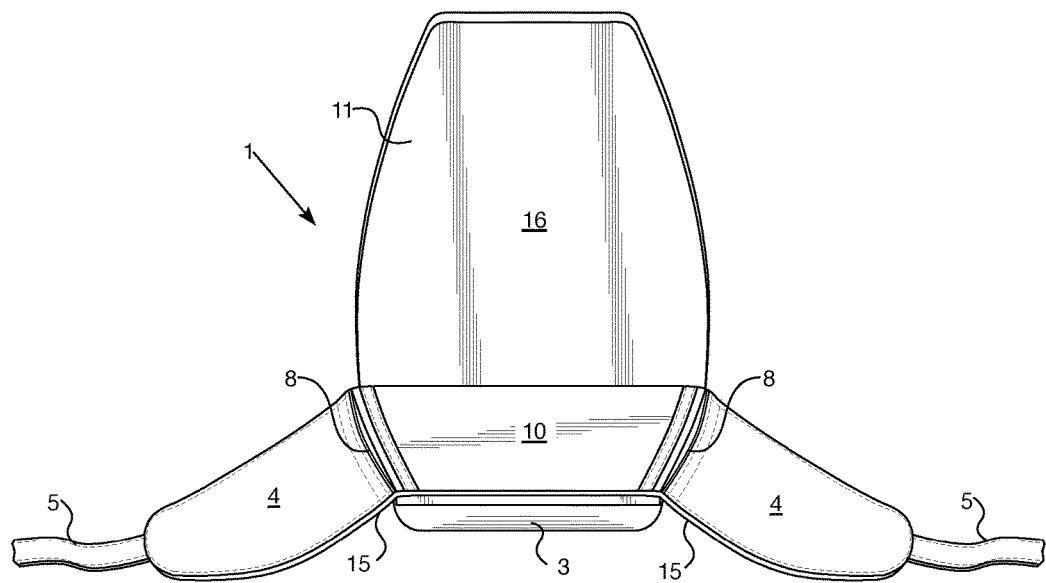
FIG. 5 is an open rear view of an embodiment of a seat of this disclosure to reveal the interior.

FIG. 5 is an open rear view of the embodiment shown in FIGS. 1-4 with the seat cover 9 removed to reveal the interior of the posterior 3 if the seat. In this view sleeve 11 holding foam 12 (not seen) is flipped up to reveal interior pocket 16. Foam 12 is inserted into or surrounded sleeve 11 in such a way that it is contoured to form the interior pocket 16 of seat 1. For practical use, it is most logical to fold the side flaps 15 with the pouches 4 and insert into the seat 1 so that tab 5 rests on outer edge near the outer flaps 6 making it easier for a user and pull to extract pouches 4 from the interior pocket 16.

Figure 6A:
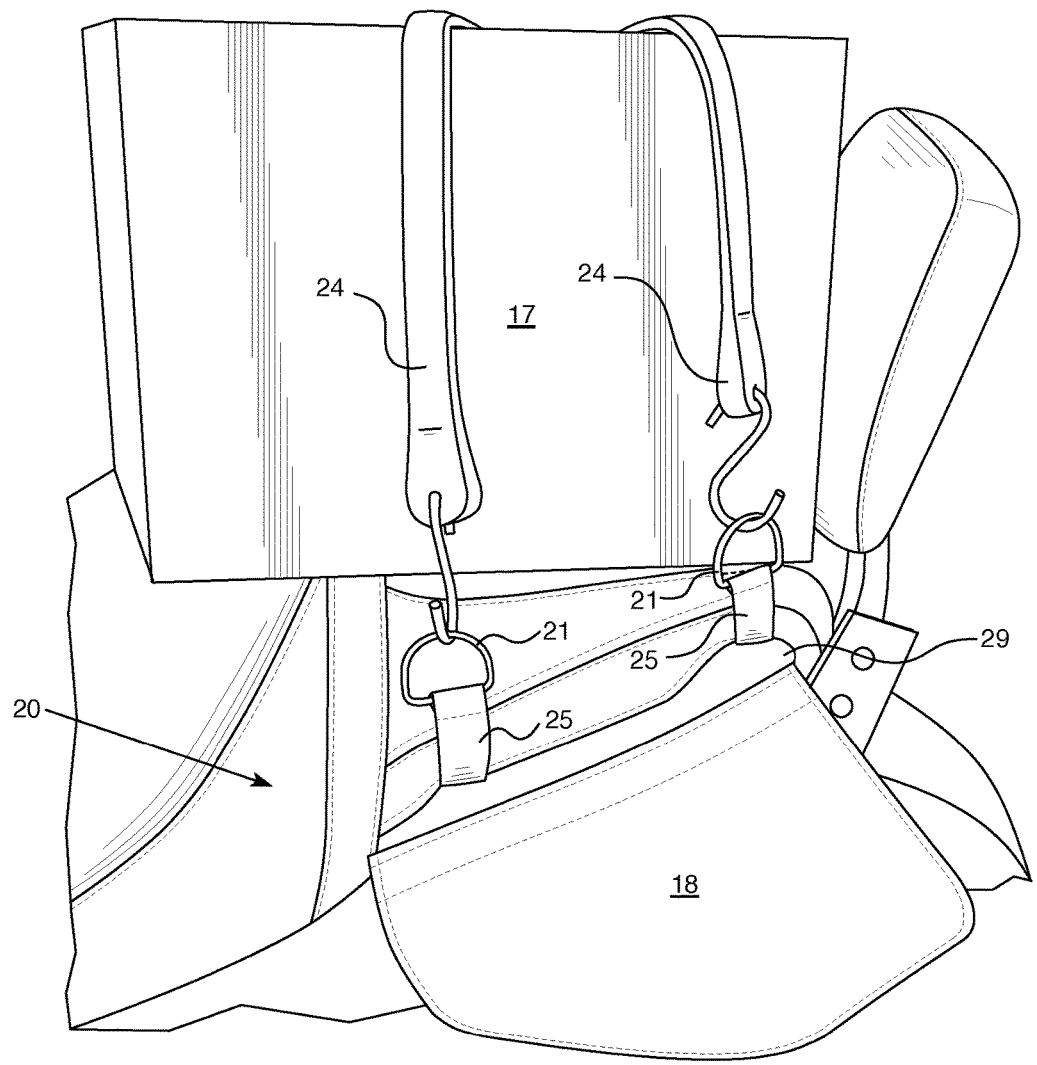
FIG. 6A depicts a sideview of an embodiment of a seat of this disclosure being used to secure large cargo on the posterior showing the pouches in a hanging position.
Figure 6B:
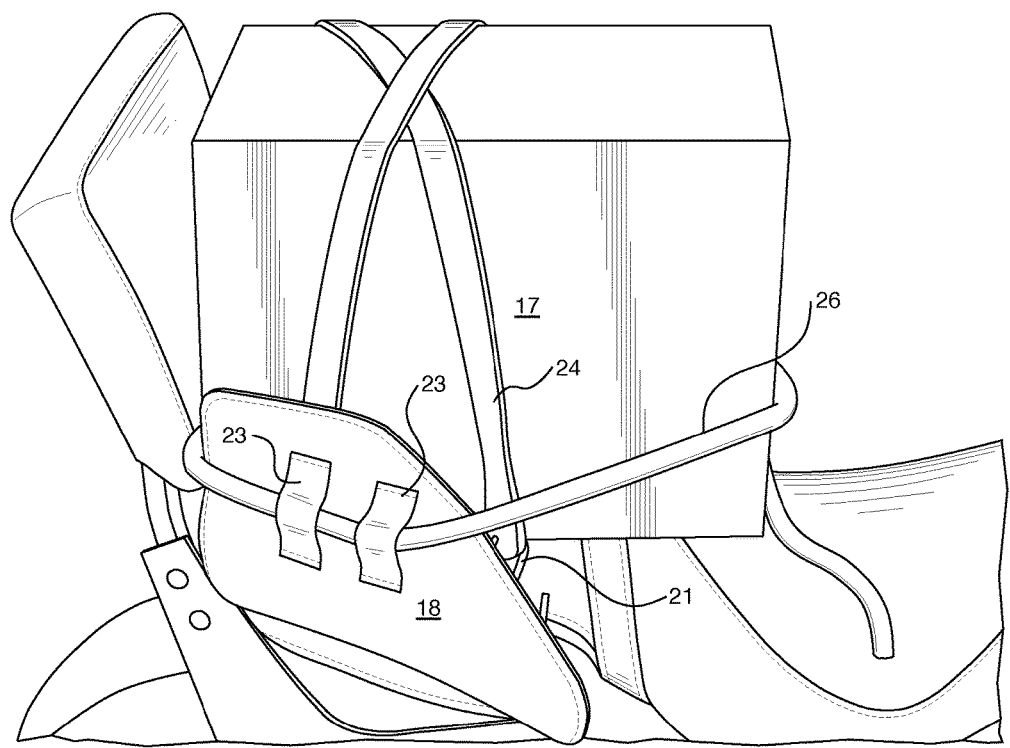
FIG. 6B depicts a sideview of an embodiment of a seat of this disclosure being used to secure large cargo on the posterior showing the pouches in a secured position.
Figure 7:
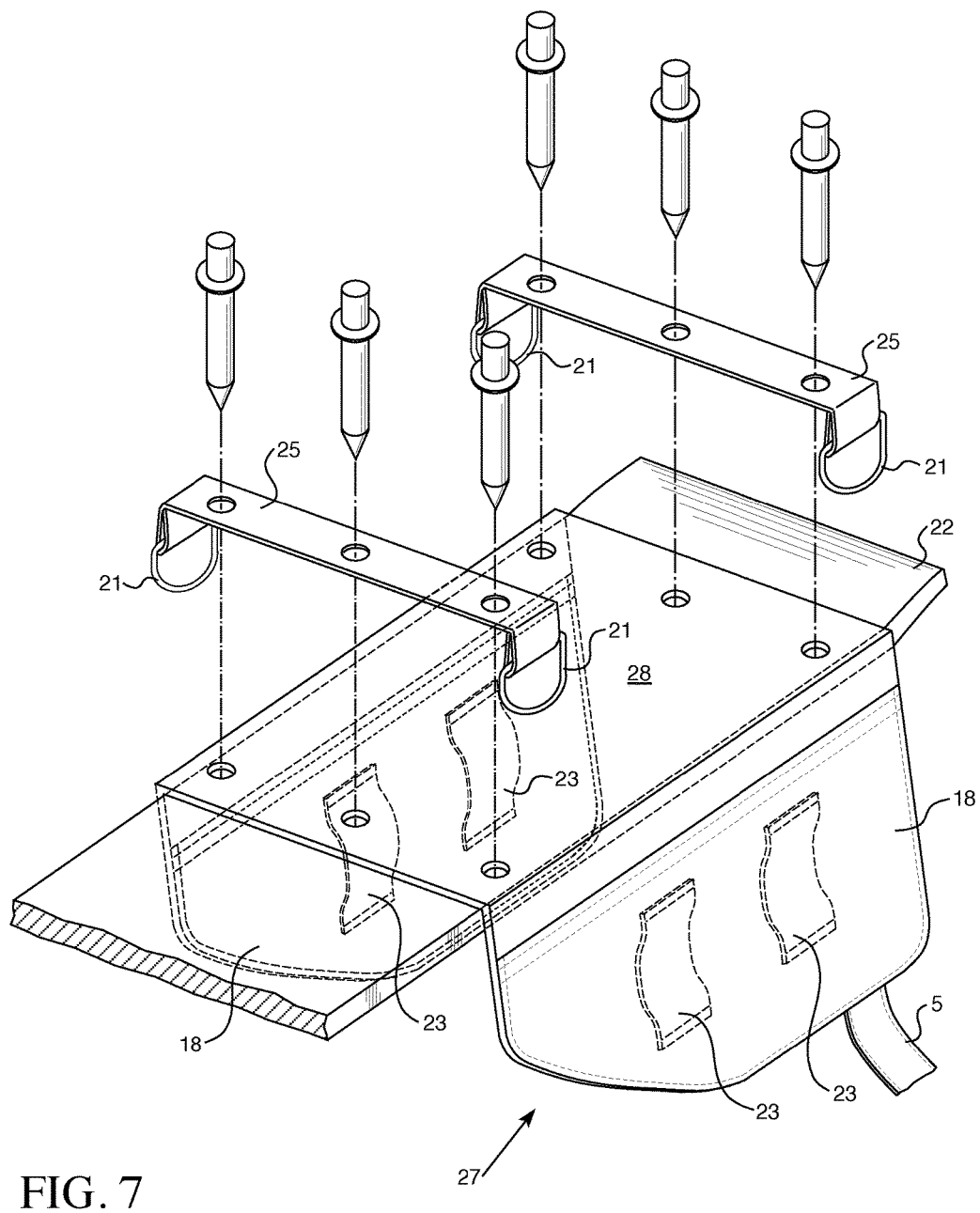
FIG. 7 depicts an attachment assembly that can be used in the embodiment shown in FIGS. 6A-6B.

FIGS. 6A-B depicts a sideview of an embodiment of a seat of this disclosure being used to secure large cargo on the posterior. FIG. 7 depicts the attachment assembly 27 separately. Rather than, using the pouches 18 to hold small items, the rider can select to use the pouches 18 to secure larger cargo 17 on the posterior 19 of seat 20 as shown here. Fastening rings 21 are fastened to horizontal attachment 28 (which in turn is connected to seat pan 22) by strap 25. Depicted here strap 25 is connect via a rivet system, but any attachment known in the art is contemplated by this disclosure. Fastening rings 21 serve as an attachment for first securing member 24. As depicted here fastening rings 21 are D rings, however any shape of fastening ring is contemplated by this disclosure. Each strap 25 is attached to the horizontal attachment 28 such that the fastening ring 21 can protrude through the slit opening 29. First securing member 24 can a bungee or other fastening means known in the art. On the rear side of pouches 18 is are loops 23. Though loops 23 are shown here preferably the backside of the pouch 18, this disclosure also contemplates loops on the front side of the pouch 18. To secure cargo 17 pouches 18 are flipped over cargo 17 and second securing member 26 is inserted in the loops 23 attached to the backside of pouches 18 and attached at fastening rings 21 securing cargo 17; keeping cargo 17 from sliding side to side or from front to back.

Herein is also disclosed a kit to install the pouch system on any non-streamlined storage system equipped seat with the requirement some seat modification. Preferably a kit is comprised of the pouch assembly comprised of pouches and the horizontal attachment with anchor points for the mounting hardware supplied, such as rivets. Optionally a seat cover with a corresponding slit for the more common seat designs may be provided. Optionally D rings to be anchored by a strap for as described above will be supplied.

The foregoing description merely illustrates the invention is not intended to be limiting. It will be apparent to those skilled in the art that various modifications can be made without departing from the inventive concept.

The invention claimed is:

1. A vehicle seat comprising:
   a pouch system, the pouch system comprising a horizontal attachment connected to one or more side flaps, each side flap further comprised of a pouch with a pouch opening,
   a seat foam and a seat pan forming an interior pocket within the seat,
   a seat cover comprised of outer flaps and a slit opening, the outer flaps and slit opening aligning with the interior pocket within the seat,
   whereby the pouch system is attached to the seat pan via the horizontal attachment such that the side flaps can be folded and stored in the interior pocket or pulled through the slit opening past the outer flaps and hang out on a lateral side of the vehicle seat.

2. The vehicle seat of claim 1, wherein the seat foam is surrounded by a sleeve and the seat foam is contoured to form the interior pocket in conjunction with the seat plate.

3. The vehicle seat of claim 1, wherein attached to the pouch is a tab.

4. The vehicle seat of claim 1, wherein the pouch system is place within a portion of the seat that does not accommodate a rider.

5. The vehicle seat of claim 1, wherein the pouch opening is further comprised of a securing system.

6. The vehicle seat of claim 1, wherein the outer flaps are further comprised of a securing system to secure the slit opening.

7. The vehicle seat of claim 1, wherein the pouches are contoured in shape.

8. The vehicle seat of claim 1, wherein the pouch is comprised of an interior, said interior comprised of additional compartments for holding smaller item.

9. The vehicle seat of claim 1 further comprising a system for securing large cargo, said system comprising a plurality of straps, each strap comprised of two ends, and at least one end of each strap comprising a fastening ring, whereby each strap is attached to the horizontal attachment such that the fastening ring can protrude through the slit opening.

10. The vehicle seat of claim 9, whereby loops are attached to the pouches.

11. A kit for installing a pouch system into a vehicle seat, said kit comprising:
   a pouch system, the pouch system comprising a horizontal attachment connected to one or more side flaps, each side flap further comprised of a pouch with a pouch opening, and the horizontal attachment comprised of anchor points for mounting hardware,
   whereby the pouch system is attached to a seat pan of the vehicle seat via the horizontal attachment such that the side flaps can be folded and stored in an interior pocket or pulled through the slit opening past the outer flaps and hang out on a lateral side of the vehicle seat.

12. The kit of claim 11 further comprising a seat cover comprised of outer flaps and a slit opening, the outer flaps and slit opening aligning with the interior pocket.

13. The kit of claim 11 further comprising a system for securing large cargo, said system comprising a plurality of straps, each strap comprised of two ends, and at least one end of each strap comprising a fastening ring, whereby each strap is attached to the horizontal attachment such that the fastening ring can protrude through the slit opening.

\* \* \* \* \*